Oct. 13, 1925.
E. N. TODD
1,557,389
MEANS FOR ASCERTAINING ELEVATIONS OF AIRCRAFTS
Filed March 16, 1925   2 Sheets-Sheet 1
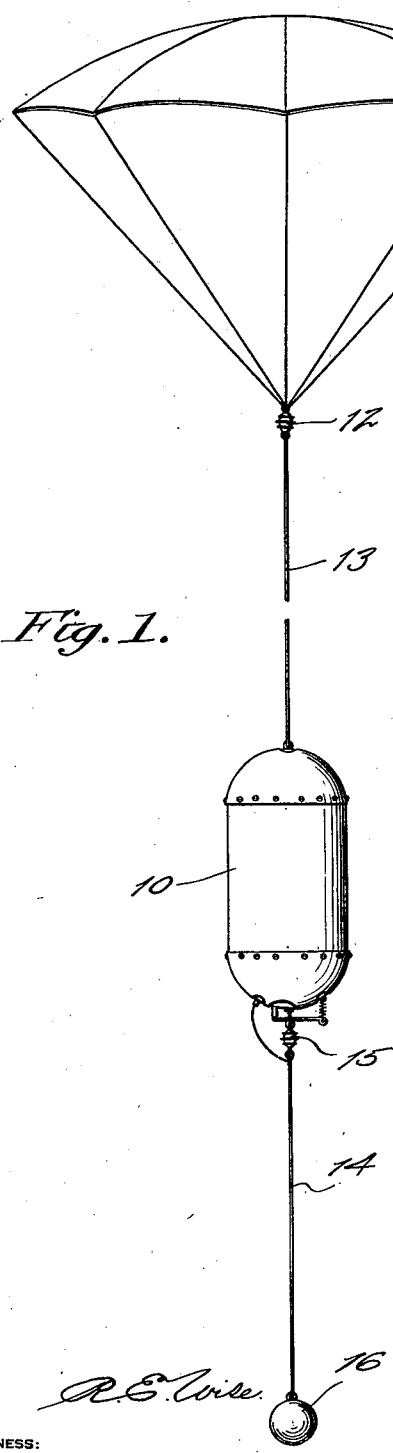
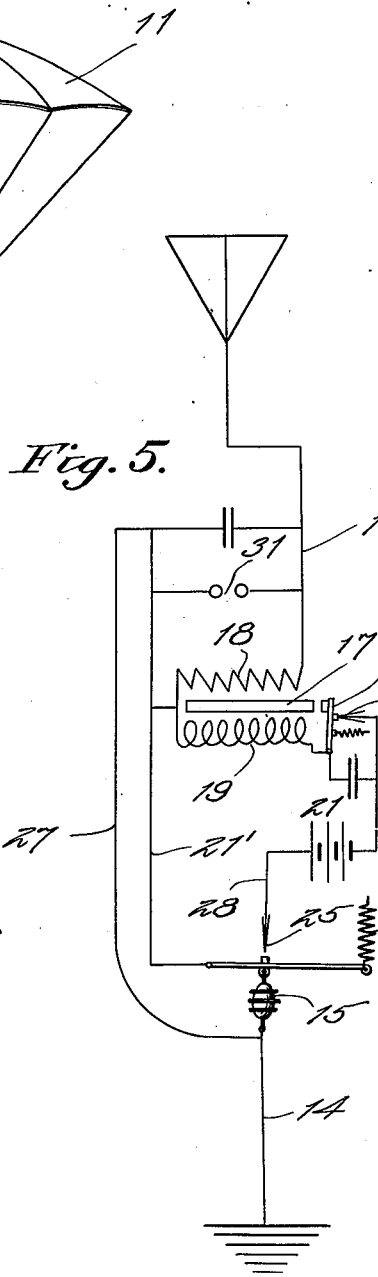
Elbert N. Todd
INVENTOR
BY Victor J. Evans
ATTORNEY Oct. 13, 1925.  1,557,389
E. N. TODD
MEANS FOR ASCERTAINING ELEVATIONS OF AIRCRAFTS
Filed March 16, 1925  2 Sheets-Sheet 2
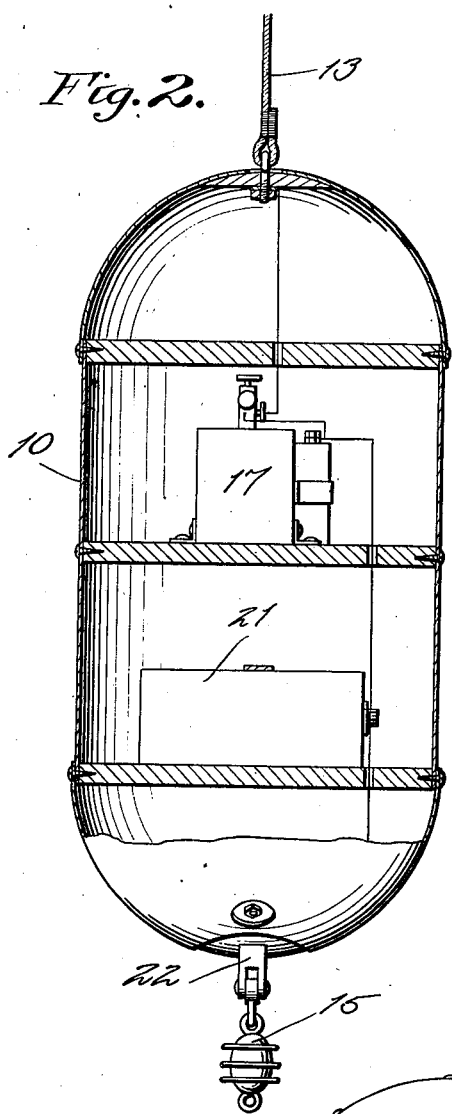
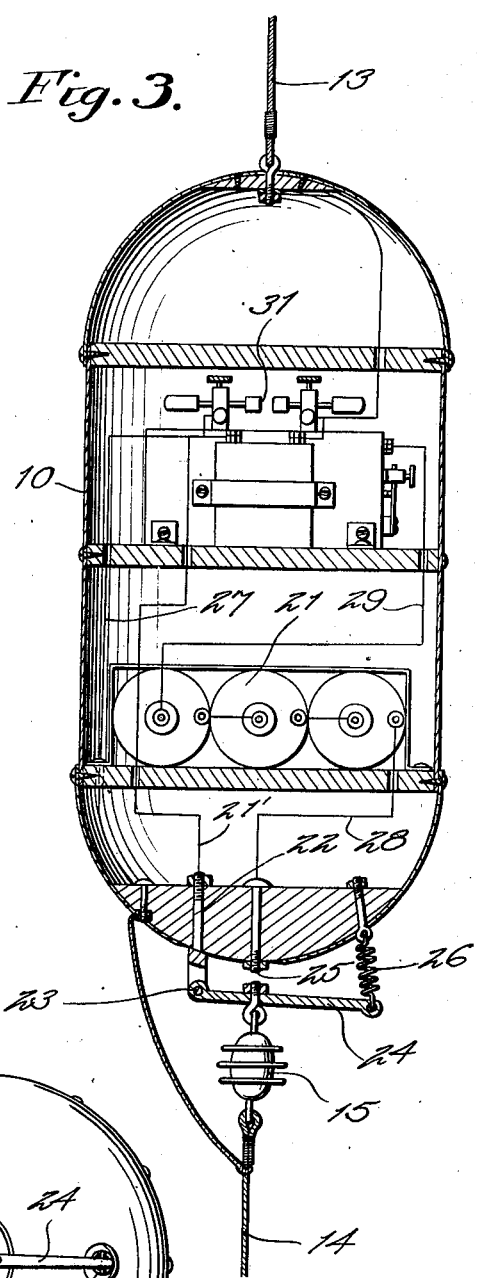
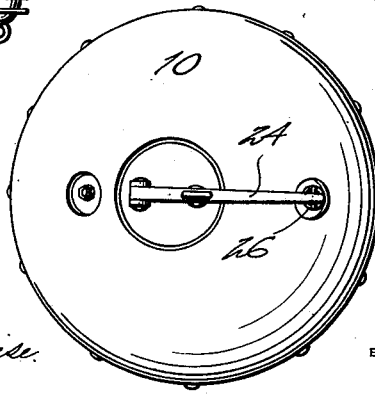
Elbert N. Todd
INVENTOR Patented Oct. 13, 1925.

1,557,389

UNITED STATES PATENT OFFICE.

ELBERT N. TODD, OF CRISFIELD, MARYLAND.

MEANS FOR ASCERTAINING ELEVATIONS OF AIRCRAFTS.

Application filed March 16, 1925. Serial No. 16,072.

*To all whom it may concern:*

Be it known that I, ELBERT N. TODD, a citizen of the United States, residing at Crisfield, in the county of Somerset and State of Maryland, have invented new and useful Improvements in Means for Ascertaining Elevations of Aircrafts, of which the following is a specification.

This invention relates to height finders for aircrafts and has for its object the provision of novel means designed to be set in action by the pilot or other occupant of an aeroplane or the like whereby the height of the plane or other craft, above the surface of the earth may be definitely ascertained, regardless of whether the flying be done by day of by night and also in case the craft be travelling above the clouds.

An important object is the provision of an apparatus of this character which embodies means for sending out a radio wave at the surface of the earth, which wave may consequently be received in a suitable receiving apparatus carried by the aircraft.

A more specific object is the provision of an apparatus of this character including a device for sending out a radio wave, the device being enclosed within a suitable housing and being adapted to be dropped overboard from the aircraft, the construction and arrangement being such that upon striking the surface of the earth or the surface of a body of water the mechanism will be operated to send out a radio wave which may be received by means of suitable apparatus in the craft, the time interval elapsing between the moment of dropping the device overboard and the moment of receiving the signal forming part of a calculation or being used in making calculations which will definitely disclose the exact height of the craft above the surface of the earth.

Another object is the provision of a device of this character which may be made comparatively inexpensively, which is easy to operate and control, positive in action, efficient and durable in service, and a general improvement in the art.

With the above and other objects and advantages in view, the invention consists in the details of construction to be hereinafter more fully described and claimed, and illustrated in the accompanying drawings in which:

Figure 1 is a side elevation of the device intended to be dropped overboard.

Figure 2 is a longitudinal section therethrough,

Figure 3 is a longitudinal section taken at right angles to Figure 2,

Figure 4 is a bottom plan view, and

Figure 5 is a diagram of the electrical circuit in the transmitting apparatus.

Referring more particularly to the drawings, the device is shown as including a casing or housing 10 within which is enclosed the radio transmitting apparatus to be described.

It is preferable to provide a parachute 11 carrying a suitable insulator 12 from which is suspended a wire 13 connected with the housing or casing 10 and constituting an aerial or antenna. Suspended and insulated from the bottom of the casing or housing 10 is a ground wire 14, insulated as shown at 15 and preferably carrying a weight 16 which will maintain the wire taut.

Mounted within the casing or housing 10 is any preferred or suitable type of radio transmitting apparatus which might be of the spark or continuous wave variety, such details being immaterial though it is naturally preferable that the apparatus be inexpensive in view of the fact that after it is used once it is forever destroyed and consequently entirely useless.

For the sake of illustration I have disclosed the transmitting apparatus as being of the spark type and including a conventional inductance coil 17 having a primary coil 18, a secondary coil 19 and the usual vibrator 20. The inductance coil is adapted to be energized by means of any suitable source of current 21 which may be a plurality of dry batteries as indicated in Figure 3, though it is obvious that a storage battery or the like might be used if preferred for any reason whatsoever. The primary and secondary coils 18 and 19 are shown as those being connected at one end with a conductor 21 connected with a stationary support 22 at the bottom of the casing or housing 10, which support has pivoted thereon, at 23, a contact arm 24 normally out of engagement with but adapted to engage against a contact 25 which is likewise mounted at the bottom of the casing or housing. A coil spring 26 may be provided connected with the contact arm 24 for the purpose of normally urging it toward the contact 25. The above described insulator 15 is suspended from the contact arm 24 so that the weight thereof combined with the weight of the wire 14 and the ball or the like 16 will normally hold the contact arm 24 out of engagement with the contact 25, in opposition to the tension of the spring 26. Also connected with the wire 21 is a conductor 27 which connects with the ground wire 14 at a point below the insulator 15. One terminal of the source of current is connected by a conductor 28 with the contact 25 while the other terminal of the source of current is connected by a conductor 29 with the stationary contact 30 of the vibrator structure. The other terminal of the primary coil 19 is connected with the vibrator arm while the remaining terminal of the secondary coil is connected with the wire 13 which constitutes the aerial or antenna. A suitable spark gap 31 is interposed between the conductors 21 and 13 so that when the inductance coil is energized upon closing of the circuit through the primary thereof a spark will pass across the gap 31 and of course send out waves from the aerial.

In the use of the device, it is apparent that it must of course be carried in the aircraft and so arranged or disposed that the contact arm 24 will be out of engagement with the contact 25. Whenever it is desired to ascertain the height of the aircraft above the surface of the earth, the entire device must be thrown overboard or dropped, a note being made as to the exact time. Of course, the parachute will open and the device will descend at a more or less rapid rate until it strikes the surface of the ground or the surface of a body of water, as the case may be. The moment that the weight 16 strikes against the ground or the surface of the water it is obvious that the pull upon the contact arm 24 will be relieved so that the spring 26 may act to swing the arm 24 into engagement with the contact 25. When this occurs the circuit is completed through the primary coil of the induction coil and the source of current. A high potential current is of course induced in the secondary coil in a well known manner and a spark will jump across the gap 31, resulting in the production of a train of waves which will radiate from the wire 13 constituting the aerial or antenna. In case the device drops upon water the wire 14 will act as a ground wire and if the device should drop upon solid ground this same wire will act in substantially the same manner in view of the fact that it will constitute a counterpoise. It will thus be seen that the instant the device strikes the surface of the earth radio waves are sent out. It is of course intended that the aircraft be equipped with some suitable type of receiving apparatus by means of which these waves may be received, the time of reception being noted. When the time interval between the dropping of the device and the reception is known, it is apparent that calculations may be made to ascertain the height of the aircraft in a very simple and easy manner as the feed of the text of the device is readily ascertainable or computable. Having this data it is evident that reference may be had to a suitable chart and in this way the exact elevation of the plane or other craft may be known.

While I have shown and described the preferred embodiment of the invention, it should be understood that I reserve the right to make such changes in the form, construction and arrangement of parts as will not depart from the spirit of the invention or the scope of the subjoined claims.

Having thus described the invention, I claim:

1. In an apparatus of the character described, the combination of a radio receiving apparatus, a portable radio transmitting apparatus adapted to be dropped, and impact operated means for controlling the energization of the transmitting mechanism.

2. In elevation finder for aircrafts, the combination of a receiving aparatus adapted to be carried upon the aircraft, a portable radio transmitting apparatus adapted to be dropped overboard from the aircraft, antenna and ground wires connected with said transmitting apparatus, means normally preventing operation of the transmitting apparatus, and earth impact release means for permitting operation of the transmitting apparatus.

3. In a height finder for aircrafts, the combination of a radio receiving apparatus carried by the aircraft, a transmitting apparatus adapted to be dropped from the air craft, an aerial wire connected with the transmitting apparatus, a parachute from which the aerial wire is suspended, a ground wire suspended from the transmitting apparatus, a normally open circuit controlled switch in the energizing circuit of the transmitting apparatus adapted to be closed upon impact with the earth whereby to close the circuit.

In testimony whereof I affix my signature.

ELBERT N. TODD.